United States Patent
Dewan

(10) Patent No.: US 11,394,565 B2
(45) Date of Patent: Jul. 19, 2022

(54) ASYMMETRIC DEVICE ATTESTATION USING PHYSICALLY UNCLONABLE FUNCTIONS

(71) Applicant: INTEL CORPORATION, Santa Clara, CA (US)

(72) Inventor: Prashant Dewan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 251 days.

(21) Appl. No.: 16/444,143

(22) Filed: Jun. 18, 2019

(65) Prior Publication Data

US 2019/0305973 A1 Oct. 3, 2019

(51) Int. Cl.
*H04L 9/32* (2006.01)
*H04L 9/30* (2006.01)
*H04L 9/14* (2006.01)
*H04L 9/08* (2006.01)

(52) U.S. Cl.
CPC .......... *H04L 9/3278* (2013.01); *H04L 9/0869* (2013.01); *H04L 9/14* (2013.01); *H04L 9/30* (2013.01); *H04L 9/3268* (2013.01)

(58) Field of Classification Search
CPC .................................................... H04L 9/3278
See application file for complete search history.

(56) References Cited

U.S. PATENT DOCUMENTS

| | | | | |
|---|---|---|---|---|
| 10,009,325 | B1* | 6/2018 | David | H04W 12/041 |
| 2002/0087872 | A1* | 7/2002 | Wells | G06F 21/72 |
| | | | | 713/193 |
| 2004/0205341 | A1* | 10/2004 | Brickell | H04L 9/3013 |
| | | | | 713/168 |
| 2008/0112596 | A1* | 5/2008 | Rhoads | G07D 7/121 |
| | | | | 382/115 |
| 2008/0165956 | A1* | 7/2008 | Zhu | H04L 9/0869 |
| | | | | 708/200 |
| 2011/0173684 | A1* | 7/2011 | Hurry | G06F 21/34 |
| | | | | 726/6 |
| 2019/0020647 | A1* | 1/2019 | Sinha | H04L 63/0407 |
| 2019/0140828 | A1* | 5/2019 | Wheeler | H04L 9/3242 |

* cited by examiner

*Primary Examiner* — Bradley W Holder
(74) *Attorney, Agent, or Firm* — KDB Firm PLLC

(57) ABSTRACT

In one example, a system for asymmetric device attestation includes a physically unclonable function (PUF) configured to generate a response to a challenge. A pseudo-random number generator generates a set of random numbers based on the response. A key generator determines co-prime numbers in the set of random numbers and generates a key pair using the co-prime numbers, wherein the public key is released to a manufacturer of the component for attestation of authenticity of the component. Through extending the PUF circuitry with a pseudo-random number generator, the present techniques are able to withstand unskilled and skilled hardware attacks, as the secret derived from the PUF is immune to extraction.

22 Claims, 7 Drawing Sheets

ASYMMETRIC DEVICE ATTESTATION USING PHYSICALLY UNCLONABLE FUNCTIONS

TECHNICAL FIELD

This disclosure relates in general to the field of semiconductors and, more particularly, to device asymmetric attestation using a physically unclonable function (PUF).

BACKGROUND

Client platforms, such as personal computers (PCs) and game consoles, typically include any number of electronic components. For example, a client platform can include several compute only devices and application processors. The compute only devices include, but are not limited to, embedded controllers (ECs), on-board graphic processing units (GPUs), on-board voltage regulators (VRs), camera controllers, trusted platform modules (TPMs), and the like. These electronic components can be replaced with counterfeits and/or malicious devices, thereby compromising the security of the entire system. Components of the client platform are authenticated to determine if counterfeit and malicious devices are installed on within the client platform.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
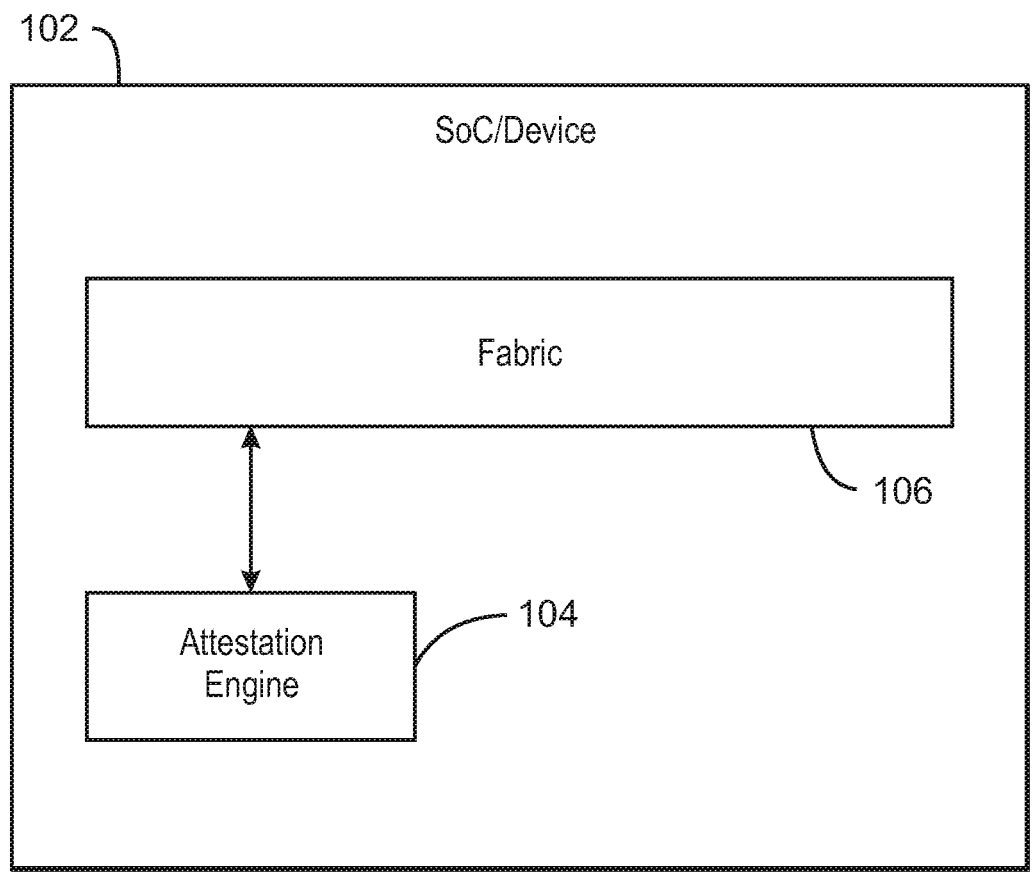
FIG. 1 is an illustration of a system that includes a device, attestation engine, and fabric.

As discussed above, components of the client platform are authenticated to determine if counterfeit or malicious devices are installed within the client platform. The components are typically integrated onto a single substrate. The single substrate may be a silicon chip with at least one processing core, and may be referred to as a system-on-chip (SoC). The components on the substrate enable complete compute functionality. For example, the components may include, but are not limited to, microprocessors (MPUs), controllers, microcontrollers (MCUs), digital signal processors (DSPs), with on-chip memory, hardware accelerators, peripheral functions, ECs, on-board GPUs, on-board VRs, camera controllers, TPMs, and the like. These components can be replaced with counterfeits and/or malicious devices, thereby compromising the security of the entire system. For example, an on-board voltage regulator (VR) can be replaced with another malicious voltage regulator that can be controlled remotely. This counterfeit VR may cause a catastrophic reduction in the safety and security of a platform containing the counterfeit VR.

To decrease the possibility of malicious on-board components, an application processor may be utilized to authenticate on board devices. The application processor might optionally report and attest to the identity of these devices to a remote server. Traditionally, a challenge-response system is used to authenticate the components on board. The challenge-response system may be rooted into an asymmetric or symmetric secret that is provisioned into the device. Alternatively, the secret may be stored in an on-board persistent storage, such as serial NOR flash (SPI-NOR). However, provisioned secrets cannot withstand unskilled or skilled hardware attacks. Moreover, once the secret is extracted by the adversary, the secret can be used to manufacture multiple counterfeit devices. Extracting a secret often involves the use of lasers and a high-resolution lens. Further, even secrets that are stored in fuses of the components are not immune to low level skilled/skilled hardware attacks. Encrypting secrets in fuses of a device with metal keys provides only weak protection, as the metal keys can also be extracted using the same lasers and high-resolution lens.

The present techniques generally enable asymmetric device attestation using physically unclonable functions (PUFs). In embodiments, a physically unclonable function (PUF) is configured to generate a response to a challenge. A pseudo-random number generator generates a set of random numbers based on the response. A key generator determines co-prime numbers in the set of random numbers and generates a key pair using the co-prime numbers, wherein the public key is released to a manufacturer of the component for attestation of authenticity of the component. Through extending the PUF circuitry with a pseudo-random number generator, the present techniques are able to withstand unskilled and skilled hardware attacks, as the secret derived from the PUF is immune to extraction.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is an illustration of a system 100 that includes a device 102, attestation engine 104, and fabric 106. The system 100 may be a client platform. The device 102 may be a system-on-chip (SoC), a portion of a system-on-chip, a Network-on-chip, an execution unit, an intellectual property (IP) block, or any other semiconductor device, such as a highly integrated processor complex, a multi-core platform, an integrated input/output (I/O) hub, or a voltage regulator. Other IP blocks can enable additional functionality, such as compute capabilities, graphics capabilities, media processing capabilities and so forth. In examples, device 100 may be any on-board component that enables complete compute functionality. For example, the device 100 may be an MPU, controller, MCU, DSP, on-chip memory or memory controller, hardware accelerator, EC, on-board GPU, camera controller, TPM, and the like.

Additionally, in examples the SoC could be a GPU SoC, an EC or some other peripheral. In some examples, the techniques described herein may be used in connection with semiconductor devices including but not limited to, routers, bridge devices, memories, and the like. As a further example, an SoC according to the present techniques may include components such as a serial peripheral interface (SPI), a universal asynchronous receiver-transmitter (UART), a controller area network (CAN) controller, a general-purpose input/output (GPIO) device, a secondary storage, and a global positioning system (GPS) device. The plurality of components of the device 102 are interconnected by a fabric 106.

The fabric 106 enables an interconnect between a plurality of components of the device 102. In embodiments, the fabric serves as a link between individual components located on a substrate of the device 102. In some cases, the fabric is a homogeneous layout of computation, storage and communication resources on silicon. An attestation engine 104 may communicate with other components of the device 100 via the fabric 104. In embodiments, the attestation engine 104 may be an IP block of the device 102 to enable various functionality attestation functionality.

In particular, the attestation engine 104 is embedded onto the device 102, and is used to authenticate the device 102. The attestation engine receives as input a challenge, and in response to the challenge responds to the challenge. An attestation authority, such as an application processor, receives the response from the attestation engine and verifies the response against an expected response. If the response matches, the device is considered to authenticated and attested. If the response does not match, the device is considered to be unauthenticated. To verify the authenticity of the device 102, a physically unclonable function (PUF) according to the present techniques may provide the response to a challenge, and the response is extended by a pseudo-random number generator. A PUF can eliminate the need for secrets stored on-chip, such as on board the device 102, by providing an unclonable device identity.

PUFs are generally modelled as challenge-response systems where a challenge c returns a response $r=f(c)$, where $f(\bullet)$ is the PUF and represents a black box from the perspective of the challenger. In embodiments, a challenge and response system may be an at least partially hardware device that enables a challenge and response protocol. The configuration and the design of the $f(\bullet)$ are hidden from the requester/challenger and the challenge c is used to change the internal gate delays/other parameters of the PUF. The security enabled by a PUF is based on the particular internal gate delays and parameters of the device, which cannot be externally measured. In particular, a secret is derived from the physical characteristics of the integrated circuitry of the device. For each PUF, a combination of the challenge and response $\{c, r\}$ is defined as a challenge-response pair (CRP). When a challenge c is input to the PUF, the secret is used to generate a response r. Unsubstantial, weak PUFs support a small number of CRPs, while stronger PUFs support many CRPs. In very strong PUFs, it may not be possible to enumerate all CRPs in a limited timeframe. In embodiments, a strong PUF is a PUF that enables a number of challenges, where the number of challenges renders the measurement and determination of all challenge-response pairs (CRPs) infeasible. By contrast, a weak PUF is a PUF that enables a number of challenges, where the measurement and determination of all challenge-response pairs (CRPs) is feasible.

A CRP $\{c, r\}$ of the PUF embedded onto a device must be pre-recorded by the manufacturer at the point of device manufacturing and stored into databases. These databases of CRPs must be owned and maintained by the manufacturer. Attestation authorities access databases of CRPs to authenticate a device via the PUF. However, a malicious attestation authority may be able to enumerate all CRPs if the PUF is weak. For example, the malicious attestation authority may attempt to authenticate a device that generates malicious response r' is response to a challenge c'. However, the malicious attestation authority it needs to a priori know r' to verify the response of the device. The malicious attestation authority may gain access to the PUF and generate a table of CRPs. The malicious attestation authority now has all the CRPs $\{c, r\}$ to create counterfeit devices.

In some cases, manufacturers derive PUFs that support many CRPs using strong PUFs. However, the symmetric nature of these CRPs still necessitates building large databases and makes the sharing of CRPs a weakness of the challenge-response protocol. In some traditional solutions, a pre-challenge known only to the manufacturer is executed prior to issuing the challenge to the PUF, thereby bringing the manufacturer in the loop for attestation. In another traditional solution, the manufacturer generates a public-private key pair, and the SoC encrypts the key pair with a PUF generated secret. The key pair may be stored in fuses of the device. The manufacturer the provides a certificate for the public-private key pair. However, this approach is susceptible to manufacturing leaks and makes key revocation very difficult, as the manufacturer must burn new fuses in the field to revoke the old key and provision a new key.

The present techniques extend the PUF circuit in the device with a PRNG and an asymmetric key generation module. Thus, when a challenger sends the challenge c, the PUF to provides a response r. The response r is provided as a seed value to the PRNG. The PRNG generates a set of random numbers and the first two prime numbers are used to generate Rivest, Shamir, and Adelman (RSA) keys ($K_{pub}$ and $K_{priv}$). The key derivation block subsequently releases the $K_{pub}$ to the SoC and the software. The manufacturer of the device takes as input the challenge and public key $\{c, K_{pub}\}$ and provides a certificate corresponding to the challenge and public key $\{c, K_{pub}\}$. The certificate attests the authentic identity of the device to any entity, such as an application processor. This can be further extended to attesting the firmware of the device to a remote entity. In particular, once the hardware is attested, the ROM in the hardware can measure the firmware that is loaded and send the measurements to the application processor/attestation entity. The manufacturer can now issue a certificate for $\{c, K_{pub}\}$ and revoke the certificate if the corresponding $K_{priv}$ stored at the SoC is compromised.

It is to be understood that the block diagram of FIG. 1 is not intended to indicate that the system 100 is to include all of the components or only the components shown in FIG. 1. Rather, the system 100 can include fewer or additional components not illustrated in FIG. 1 (e.g., additional memory components, embedded controllers, additional sensors, additional interfaces, etc.).

Figure 2:
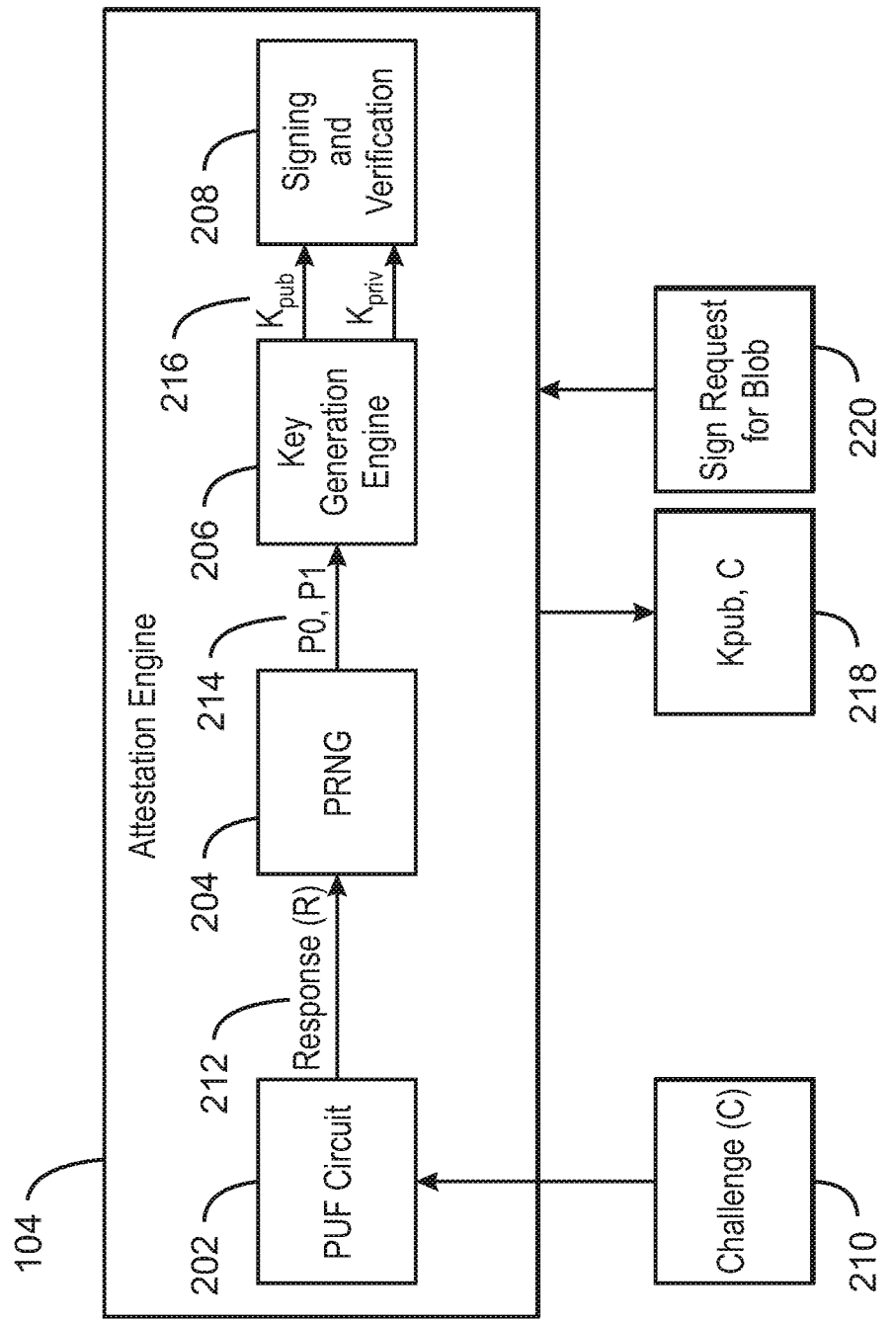
FIG. 2 is an illustration of a system comprising an attestation engine.

FIG. 2 is an illustration of a system 200 comprising an attestation engine 104. In examples, the attestation engine 104 is as illustrated in FIG. 1. The system 200 may be, for example, embedded in the hardware of a component of a client platform as discussed above. The attestation engine may include a PUF circuit 202, a PRNG 204, a key generation engine 206, and a signing and verification engine 208. In embodiments, each of the PUF circuit, PRNG 204, key generation engine 206, and signing and verification 208 may be embedded in hardware of component including the attestation engine 104. The PUF circuit generates a unique response r 212 based on a challenge c 210. The present techniques are agnostic to the type of PUF used. In embodiments, the PUF may be an optical PUF, silicon PUF, arbiter PUF, a ring oscillator PUF, and SRAM PUF, The present techniques are also agnostic to the exact circuit parameters that are extracted from the circuit to generate the response r.

The PUF is used to generate a security primitive establish an asymmetric authentication scheme. In embodiments, the PUF is a physical structure that, when measured or challenged, provides a unique, repeatable and unpredictable response. Creating a physical copy of the PUF with an identical challenge-response behavior is difficult, Thus, the challenge-response behavior enabled by the PUF is unclonable, even by the manufacturer. In some cases, the response 212 is input to the key generation engine. The key generation engine may be configured to generate a large number of keys. While many keys may be generated by the key generation engine, the actual number of keys that can be generated is flexible and can be configured based on particular requirements and needs of device manufacturers and/or verifiers.

A seed value may be input to the PRNG 204. As illustrated, the PRNG is seeded by the response r 212 from the PUF circuit. The response r is not stored anywhere in DRAM or persistent storage and is not transmitted externally of the attestation engine 104. In embodiments, the PRNG may be seed by a key generated by the key generation engine in response to the response r 212 as an input. Once the PRNG 204 receives the response r 212, it generates a set of multiple random numbers, and transmits each random number to the key generation engine to find co-primes. By contrast, traditional solutions send the response r 212 to a third party such as a manufacturer for further verification of an issued certificate. By keeping the response 212 of the CRP hidden and internal to the attestation engine, malicious attestation authorities cannot enumerate the CRPs associated with a particular circuit.

The PRNG 204 is used to generate a sequence of pseudo-random numbers using a seed value, such as a key or the response r 212, as an input value. The sequence of numbers output from the PRNG 204 may approximate output values of a true-random number generator. However, the sequence of numbers output from the PRNG 204 can be reproduced. In this manner, the PRNG is deterministic and for a particular input, the PRNG generates the same sequence of numbers as an output. In embodiments, the PRNG 204 may be implemented in a software algorithm, a hardware shift register, or according to any other approach. In embodiments, the PRNG 204 may be a hardware random number generator (HRNG), cryptographically secure pseudo-random number generator (CSPRNG), or cryptographic pseudo-random number generator (CPRNG). The generation of random numbers at the PRNG 204 may use entropy obtained from a high-quality source, such as the operating system's randomness application programming interface (API). If more random numbers are needed than there is entropy available, the available entropy may be stretched over more bits. Additionally, in embodiments, the PRNG 204 includes a block cipher that operates in a counter mode to generate pseudo-random numbers.

The PRNG 204 generates random numbers that are sent to the key generation engine 206 until at least two prime numbers are obtained. These primes, P0 and P1, may be referred to as co-primes 214. The random numbers generated by the PRNG 204 are based on the input seed value response r 212. The co-primes 214 are identified from the sequence of random numbers sent from the PRNG to the key generation engine 206. The key generation engine 206 discovers co-primes in the sequence of random numbers transmitted from the PRNG 204 and notifies the PRNG 206 to terminate transmission of random numbers. The key generation engine then generates a private and public key pair ($K_{pub}$ and $K_{priv}$) from the prime numbers 214. The key pair $K_{pub}$ and $K_{priv}$ are subsequently provided to the signing and verification engine 208. The private key $K_{priv}$ of the key pair 216 never leaves the key generation/signing and verification engine. Since the public key is made available to the world while the private key never leaves the key generation/signature engine, the key generation engine is asymmetric. Additionally, the private key is never stored anywhere and is generated at runtime.

The key pair 216 may be according to the public key encryption algorithm developed by Rivest, Shamir, and Adelman (RSA). The RSA key pair includes two keys, one a public key and the other a private key. The public key may be sent to a third party, such as a manufacturer, to obtain a certificate. Thus, the public key $K_{pub}$ and challenge c 218 are transmitted outside of the attestation engine 214. The manufacturer provides the certificate for the device corresponding to the challenge-public key pair 218, and can issue multiple certificates for the challenge-public key pair 218. The private key $K_{priv}$ of the key pair 216 is kept secret. In embodiments, the key pair comprises a public key used for encryption and a private key used for decryption.

The signing and verification engine 208 exposes interfaces for reading the public key $K_{pub}$ and submitting a signature request or a blob 220 to the engine, then verifying the blob using the private key $K_{priv}$. In embodiments, a host application processor sends a challenge and blob to a device including the system 200. The device may be, for example, an on-board voltage regulator. The blob can be few bytes of data or any nonce value. The device sends the blob to the signing and verification engine 208. The signing and verification engine 208, signs the blob with the private key and transmits the signed blob to the device. The device transmits the blob signed back to the host application processor. Using the public key, host application processor can verify the signed blob.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional memory components, embedded controllers, additional sensors, additional interfaces, etc.).

Figure 3:
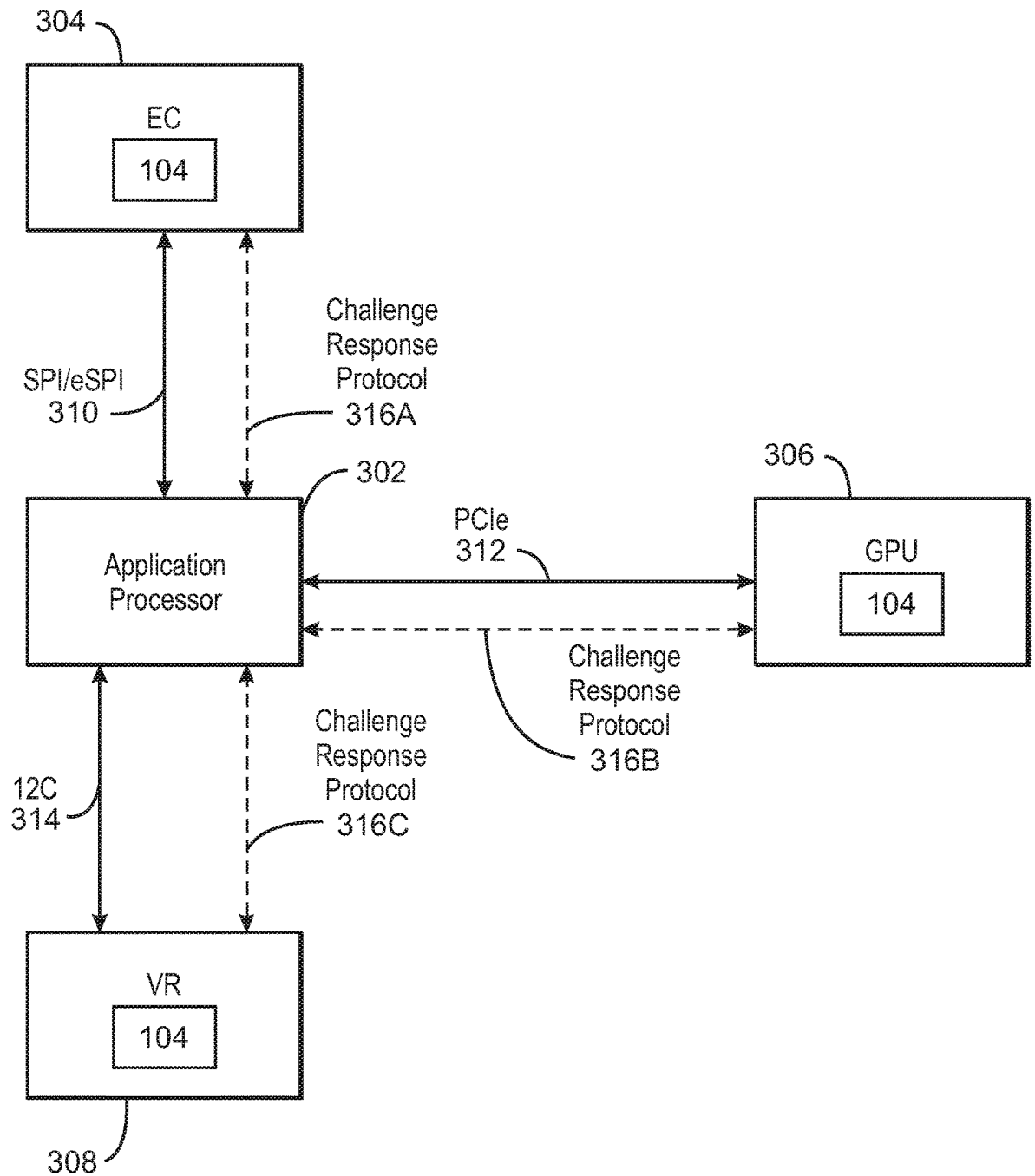
FIG. 3 is a block diagram of a system with asymmetric device attestation.

FIG. 3 is a block diagram of a system 300 with asymmetric device attestation. The system 300 includes an application processor 302, an embedded circuit 304, a GPU 306, and a voltage regulator 308. The respective manufacturer of each component, such as the application processor 302, an embedded circuit 304, a GPU 306, and a voltage regulator 308, generates certificates for a set of challenge and public key pairs {c, $K_{pub}$}, such as the challenge and public key pair 218 (FIG. 2). If a $K_{priv}$ gets compromised for some reason, the manufacturer can issue a certificate revocation list (CRL) for the corresponding CRP. In embodiments, the private key $K_{priv}$ corresponding to the CRP is the private key $K_{priv}$ derived from the response r 212 (FIG. 2) of the CRP.

In FIG. 3, the application processor 302 may be an attestation authority. Each of the components 304, 306, and 308 may include an attestation engine 104 as described with respect to FIGS. 1 and 2. Each of the components of system 300 may be subjected to authentication via the attestation authority as described herein. Each component is illustrated as providing communications according to a challenge and response protocol 316.

Components of an SoC include a management interface to the host or application processor 302. For example, the embedded circuit 304 interfaces with the application processor 302 via a serial peripheral interface (SPI)/enhanced serial peripheral interface (eSPI) 310. The SPI/eSPI interface 310 is a synchronous serial communication interface specification used for short-distance communication, primarily in embedded systems. The asymmetric authentication as described herein can be executed via the SPI/eSPI interface 310 and a challenge response protocol 316A. Similarly, the GPU 306 interfaces with the application processor 302 via a Peripheral Component Interconnect Express (PCIe) interface 312. The PCIe interface 312 is according to specifications developed by the Peripheral Component Interconnect Special Interest Group (PCI-SIG). The PCIe interface 312 is a high-speed serial computer expansion bus standard. The asymmetric authentication as described herein can be executed via the PCIe interface 312 and a challenge response protocol 316B. Finally, the voltage regulator 308 interfaces with the application processor 302 via a voltage regulator interface 314 such as an Inter-Integrated Circuit ($I^2C$) interface. The $I^2C$ interface is a synchronous, multi-master, multi-slave, packet switched, single-ended, serial computer bus originally released in 1982 by Philips Semiconductor. The $I^2C$ interface may be used for attaching lower-speed peripheral ICs to processors and microcontrollers in short-distance, intra-board communication. The asymmetric authentication as described herein can be executed via the voltage regulator or $I^2C$ interface 314 and a challenge response protocol 316C.

Thus, each of the embedded circuit 304, GPU 306, and voltage regulator 308 can be authenticated to an application processor via a respective attestation engine in an asymmetric manner. There are no additional requirements on the application processor for the challenge response protocol. The present techniques are agnostic to the high-level challenge-response protocol used. Thus, any challenge response protocol may be used according to the present techniques.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional memory components, embedded controllers, additional sensors, additional interfaces, etc.).

Figure 4A:
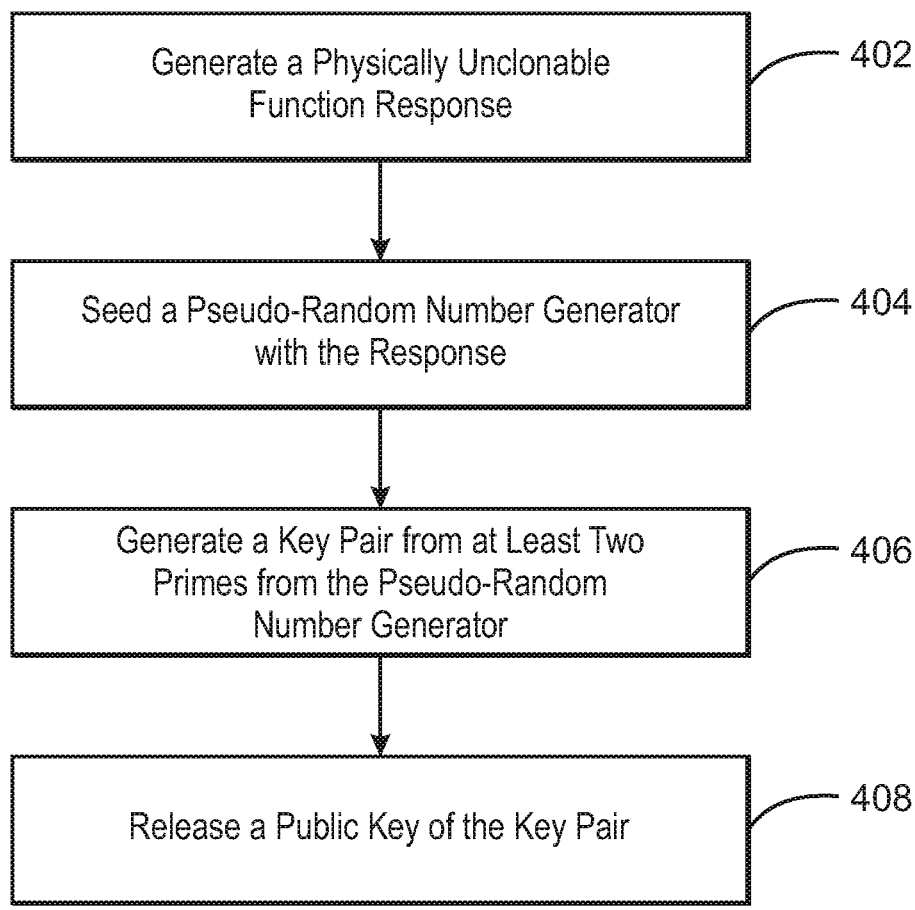
FIG. 4A is a process flow diagram of a method for asymmetric attestation using a physically unclonable function (PUF)

FIG. 4A is a process flow diagram of a method 400A for asymmetric attestation using a physically unclonable function (PUF). In embodiments, asymmetric authentication is enabled via an interface provided by the component to read the public key and submit the challenge. Additionally, the device manufacturer must issue certificates signed by the device manufacturer. At block 402, a physically unclonable function (PUF) is used to generate a response. In particular, a challenge may be sent by a challenger such as an application processor 302 (FIG. 3). Thus, the attestation authority may be an application processor. In response to the challenge, the PUF of the device being authenticated outputs a response r.

At block 404, a pseudo-random number generator (PRNG) is seeded with the response r from the PUF. In response to the input, the PRNG may generate a sequence of pseudo-random numbers, and transmit the pseudo-random numbers to a key generation unit. In embodiments, the PRNG sends pseudo-random numbers to the key generation unit until the key generation unit derives at least two prime numbers from the sequences of pseudo-random numbers. The at least two prime numbers may be referred to as co-primes.

At block 406, a key pair is generated from the at least two primes output from the PRNG. In embodiments, the key pair is an RSA key pair. In embodiments, the key pair includes a public key $K_{pub}$ and a private key $K_{priv}$. At block 408, the public key $K_{pub}$ of the key pair is released. The public key $K_{pub}$ may be transmitted to a manufacturer with the corresponding challenge. Based on the challenge and public key $K_{pub}$, the manufacturer can issue a certificate attesting to the authority of the device. In embodiments, a blob may be submitted to the signing and verification engine, where it is signed using the public key $K_{pub}$ and transmitted to the host processor to attest to the authenticity of the device.

Figure 4B:
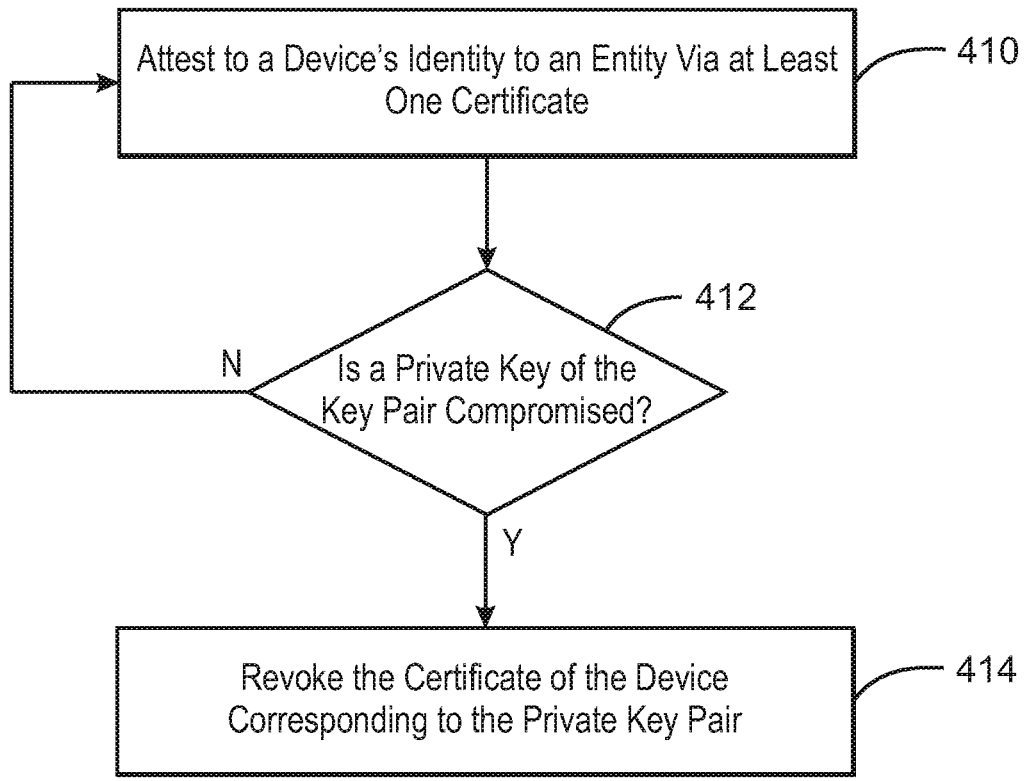
FIG. 4B is a process flow diagram of a method for asymmetric attestation using a physically unclonable function (PUF)

FIG. 4B is a process flow diagram of a method 400B for signing and verification based on asymmetric attestation using a physically unclonable function (PUF). At block 410, the device's identity is attested via at least one certificate.

At block 412, it is determined if a private key of the key pair is compromised. The private key corresponds to the public key and challenge used to obtain the certificate. If the private key is not compromised, process flow returns to block 410 the device's identity is attested via the certificate. If the private key is not compromised, process flow continues to block 414. At block 414, the certificate of the device corresponding to the private key is revoked. In this manner, the challenger will be notified that the device is counterfeit. Further steps can be taken to quarantine the counterfeit device.

The process flow diagram of FIGS. 4A and 4B are not intended to indicate that the operations of the methods 400A and 400B are to be executed in any particular order, or that all of the operations of the methods 400A and 400B are to be included in every case. Additionally, the methods 400A and 400B can include any suitable number of additional operations.

Figure 5:
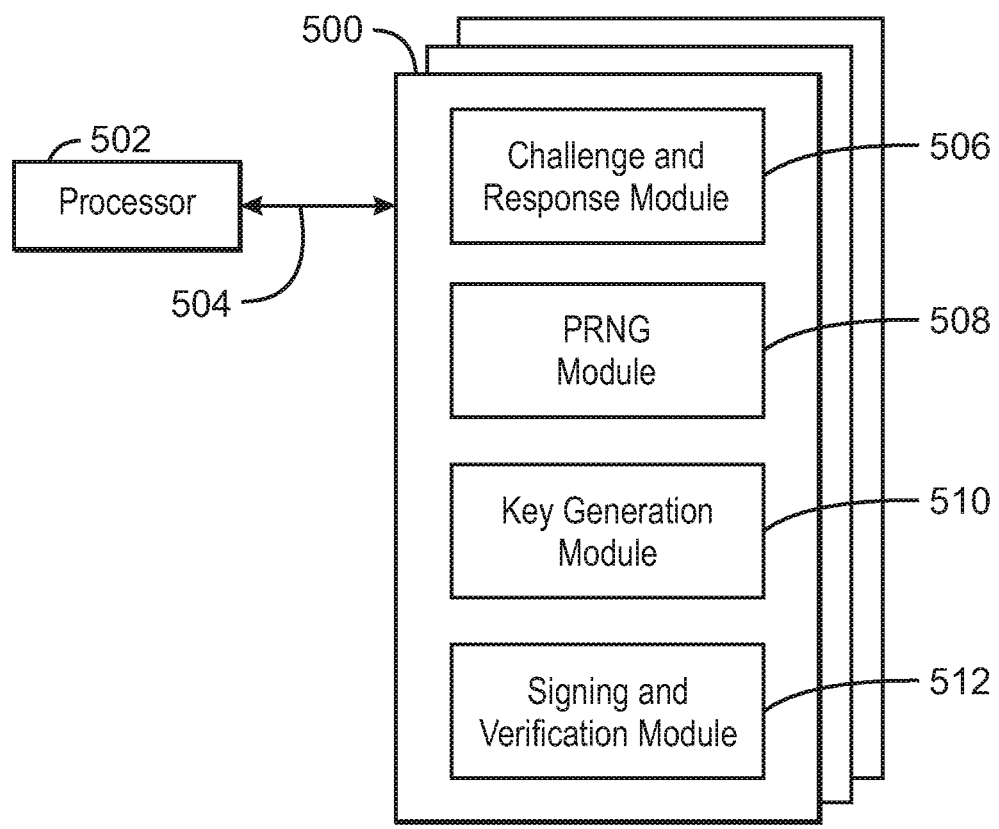
FIG. 5 illustrates a block diagram of a non-transitory computer readable media for asymmetric device attestation using physically unclonable functions.

FIG. 5 illustrates a block diagram of a non-transitory computer readable media for asymmetric device attestation using physically unclonable functions. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a challenge and response module 506 may enable a challenge and response protocol between the device or component being authenticated and the attestation authority. The challenge and response module 506 may obtain a challenge from the challenger and generate a response according to any challenge and response technique. A PRNG module 508 may be configured to generate random numbers using the response from the challenge and response module 506 as a seed value. A key generation module 510 may be used to generate a key pair from the two co-primes obtained from random numbers generated by the PRNG module 508. The key pair may include a public key and a private key. The signing and verification module 512 may use the public key and the private key to validate a blob. In particular, a device sends the blob to the signing and verification module 512. The signing and verification module 512 signs the blob with the private key, and the signed blob is transmitted to the host application processor. Using the public key, host application processor can verify the signed blob and attest to the authenticity of the device.

It is to be understood that any suitable number of the software components shown in FIG. 5 may be included within the tangible, non-transitory computer-readable medium 500. Furthermore, any number of additional software components not shown in FIG. 5 may be included within the tangible, non-transitory, computer-readable medium 500, depending on the specific application.

Figure 6:
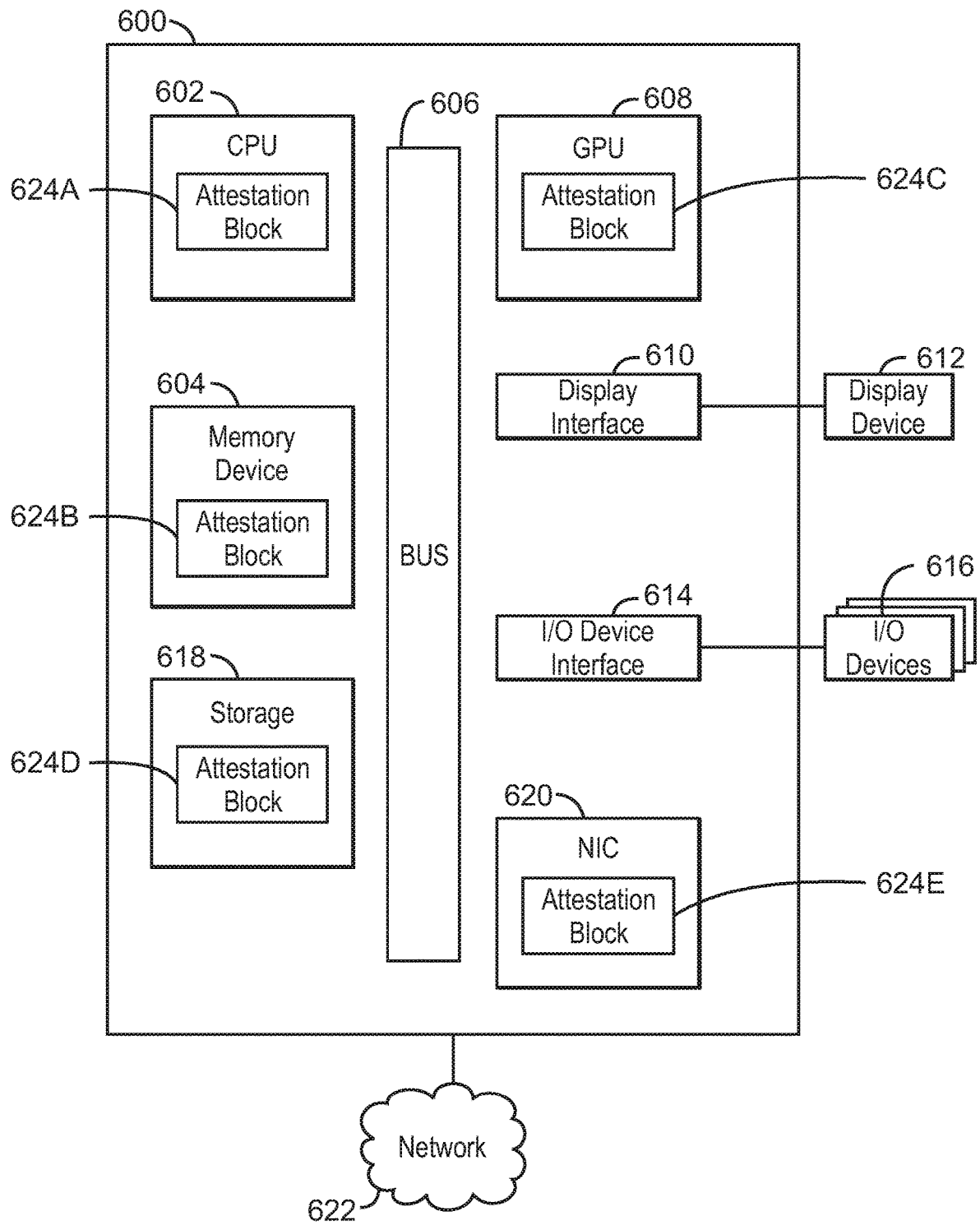
FIG. 6 a block diagram of an example of a host computing device that enables asymmetric device attestation using physically unclonable functions.

FIG. 6 a block diagram of an example of a host computing device that enables asymmetric device attestation using physically unclonable functions. Generally, the asymmetric device attestation using physically unclonable functions as described herein enables a greater level of security, as no secret is stored either in the SoC or outside the SoC. The present techniques cannot be attacked using passive hardware attacks since the secret is based on circuit characteristics, such as a time delay of the signal that is extremely hard to estimate using a passive hardware attack. Moreover, the present techniques enable an unlimited number of authentication attempts and supports revocation by simply changing c and revoking the certificate with older c. With respect to the manufacturer, the preset techniques do not need the manufacturer to store the secrets in any database offline or on NV storage on the board. The present techniques enable use of traditional RSA infrastructure for attestation of devices instead of using new setting up new attestation/revocation services. Finally, the present techniques are hardened against manufacturing attacks or insider attacks.

The host computing device 600 may be, for example, an integrated on-chip computer, such as an SoC. The host computing device may also be a mobile phone, laptop computer, desktop computer, or tablet computer, among others. The host computing device 600 may include a central processing unit (CPU), application processor, or processor 602 that is adapted to execute stored instructions, as well as a memory device 604 that stores instructions that are executable by the processor 602. The processor 602 can be a single core processor, a multi-core processor, a computing cluster, or any number of other configurations. In some examples, the processor 602 may be a system-on-chip (SoC) with a multi-core processor architecture. The processor 602 may provide a challenge to various attestation blocks 624 of embedded components within the device 600. In embodiments, the processor itself may be authenticated by an attestation block 624A. The attestation block 624A may be an attestation engine 104 as described in FIGS. 1-4B.

The memory device 604 can include random access memory, read only memory, or any other suitable memory systems. For example, the memory device 604 may include dynamic random-access memory (DRAM). The memory device 604 can include random access memory (RAM), read only memory (ROM), flash memory, or any other suitable memory systems. The memory device 604 may include attestation block 624B to enable asymmetric device attestation using physically unclonable functions for the memory device. The attestation authority 624B may be located within a memory controller or a memory engine of the memory device 604. The attestation block 624B may be an attestation engine 104 as described in FIGS. 1-4B.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600. The GPU 608 may include an attestation authority 624C to enable asymmetric device attestation using physically unclonable functions for the GPU. The attestation block 624C may be an attestation engine 104 as described in FIGS. 1-4B.

The processor 602 may also be linked through the system interconnect 606 (e.g., PCI®, PCI-Express®, NuBus, etc.) to a display interface 610 adapted to connect the host computing device 600 to a display device 612. The display device 612 may include a display screen that is a built-in component of the host computing device 600. The display device 612 may also include a computer monitor, television, or projector, among others, that is externally connected to the host computing device 600. The display device 612 can include light emitting diodes (LEDs), and micro-LEDs, among others.

The processor 602 may be connected through a system interconnect 606 to an input/output (I/O) device interface 614 adapted to connect the computing host device 600 to one or more I/O devices 616. The I/O devices 616 may include, for example, a keyboard and a pointing device, wherein the pointing device may include a touchpad or a touchscreen, among others. The I/O devices 616 may be built-in components of the host computing device 600, or may be devices that are externally connected to the host computing device 600.

The computing device 600 also includes a storage device 618. The storage device 618 is a physical memory such as a hard drive, an optical drive, a thumbdrive, an array of drives, a solid-state drive, or any combinations thereof. The storage device 618 may also include remote storage drives. The storage device 618 may include an attestation authority 624D to enable asymmetric device attestation using physically unclonable functions for the storage device 618. The attestation authority 624D may be located within a storage controller or a storage engine of the storage device 618. The attestation block 624D may be an attestation engine 104 as described in FIGS. 1-4B.

In addition, a network interface controller (also referred to herein as a NIC) 620 may be adapted to connect the host computing device 600 through the system interconnect 606 to a network 622. The network 622 may be a cellular network, a radio network, a wide area network (WAN), a local area network (LAN), or the Internet, among others. In embodiments, the NIC 620 may include an attestation authority 624E to enable asymmetric device attestation using physically unclonable functions for the NIC 620. The attestation authority 624E may be located within a controller of the NIC 620. The attestation block 624E may be an attestation engine 104 as described in FIGS. 1-4B.

It is to be understood that the block diagram of FIG. 6 is not intended to indicate that the host computing device 600 is to include all of the components shown in FIG. 6. Rather, the host computing device 600 can include fewer or additional components not illustrated in FIG. 6 (e.g., additional memory components, embedded controllers, additional modules, additional network interfaces, memory controllers, etc.). Furthermore, any of the functionalities of the attestation blocks 624A, 624B, 624C, 624D, and 624E may be partially, or entirely, implemented in hardware and/or software of the respective component. For example, some functionality may be implemented with an application specific integrated circuit, logic implemented in an embedded controller, or in logic implemented in the processor 602, among others.

Example 1 is a system for asymmetric device attestation. The system includes a physically unclonable function (PUF) corresponding to a component, configured to generate a response to a challenge; a pseudo-random number generator to generate a set of random numbers based on the response; a key generator to determine co-prime numbers in the set of random numbers and generate a key pair using the co-prime numbers, wherein the public key is released to a manufacturer of the component for attestation of authenticity of the component.

Example 2 includes the system of example 1, including or excluding optional features. In this example, the public key and the challenge are transmitted to the manufacturer, and in response to manufacturer attests to the authenticity of the component by issuing a certificate.

Example 3 includes the system of any one of examples 1 to 2, including or excluding optional features. In this example, the physically unclonable function (PUF) is one of an optical PUF or silicon PUF.

Example 4 includes the system of any one of examples 1 to 3, including or excluding optional features. In this example, the pseudo-random number generator terminates the generation of the set of random numbers in response to the key generator determining co-prime numbers in the set of random numbers.

Example 5 includes the system of any one of examples 1 to 4, including or excluding optional features. In this example, the key pair is a Rivest, Shamir, and Adelman key pair.

Example 6 includes the system of any one of examples 1 to 5, including or excluding optional features. In this example, the key pair comprises a public key used for encryption, and a private key used for decryption.

Example 7 includes the system of any one of examples 1 to 6, including or excluding optional features. In this example, an attestation authority issues the challenge via a management interface of the component.

Example 8 includes the system of any one of examples 1 to 7, including or excluding optional features. In this example, authentication of the component is asymmetric.

Example 9 includes the system of any one of examples 1 to 8, including or excluding optional features. In this example, in response to the private key being compromised, the manufacturer revokes a certificate issued in response to the public key and the challenge.

Example 10 includes the system of any one of examples 1 to 9, including or excluding optional features. In this example, in response to the private key being compromised, the manufacturer revokes the certificate and the device is quarantined.

Example 11 includes the system of any one of examples 1 to 10, including or excluding optional features. In this example, the physically unclonable function (PUF), pseudo-random number generator, key generator, and a signing and verification controller enables an attestation engine that is to take as input the challenge.

Example 12 is a method for asymmetric device attestation. The method includes generating a response to a challenge via a physically unclonable function (PUF) corresponding to a component; generating a set of random numbers based on the response; determining co-prime numbers in the set of random numbers; and generating a key pair using the co-prime numbers, wherein the public key is released to a manufacturer of the component for attestation of authenticity of the component.

Example 13 includes the method of example 12, including or excluding optional features. In this example, the public key and the challenge are transmitted to the manufacturer, and in response to manufacturer attests to the authenticity of the component.

Example 14 includes the method of any one of examples 12 to 13, including or excluding optional features. In this example, the physically unclonable function (PUF) is one of an optical PUF or silicon PUF.

Example 15 includes the method of any one of examples 12 to 14, including or excluding optional features. In this example, the generation of the set of random numbers terminates in response to the key generator determining co-prime numbers in the set of random numbers.

Example 16 includes the method of any one of examples 12 to 15, including or excluding optional features. In this example, the key pair is a Rivest, Shamir, and Adelman key pair.

Example 17 includes the method of any one of examples 12 to 16, including or excluding optional features. In this example, the key pair comprises a public key used for encryption, and a private key used for decryption.

Example 18 includes the method of any one of examples 12 to 17, including or excluding optional features. In this example, an attestation authority issues the challenge via a management interface of the component.

Example 19 includes the method of any one of examples 12 to 18, including or excluding optional features. In this example, authentication of the component is asymmetric.

Example 20 includes the method of any one of examples 12 to 19, including or excluding optional features. In this example, in response to the private key being compromised, a manufacturer revokes a certificate issued in response to the public key and the challenge.

Example 21 includes the method of any one of examples 12 to 20, including or excluding optional features. In this example, in response to the private key being compromised, the manufacturer revokes the certificate and the device is quarantined.

Example 22 is an apparatus for asymmetric device attestation. The apparatus includes a challenge and response system corresponding to a component, configured to generate a response to a challenge; a pseudo-random number generator to generate a set of random numbers based on the response; a key generator to determine co-prime numbers in the set of random numbers and generate a key pair using the co-prime numbers, wherein the public key is released to a manufacturer of the component for attestation of authenticity of the component.

Example 23 includes the apparatus of example 22, including or excluding optional features. In this example, the public key and the challenge are transmitted to the manufacturer, and in response to manufacturer attests to the authenticity of the component by issuing a certificate.

Example 24 includes the apparatus of any one of examples 22 to 23, including or excluding optional features. In this example, the challenge and response system is one of an optical PUF or silicon PUF.

Example 25 includes the apparatus of any one of examples 22 to 24, including or excluding optional features. In this example, the pseudo-random number generator terminates the generation of the set of random numbers in response to the key generator determining co-prime numbers in the set of random numbers.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for asymmetric device attestation, comprising:
   a physically unclonable function (PUF) corresponding to circuitry of a component of a device, configured to generate a response to a challenge; and
   a hardware component comprising:
      a pseudo-random number generator to generate a set of random numbers based on the response; and
      a key generator to determine co-prime numbers in the set of random numbers and generate a key pair using the co-prime numbers,
      wherein a public key of the key pair is released to a manufacturer of the component for attestation of authenticity of the component, and
      wherein the pseudo-random number generator terminates the generation of the set of random numbers in response to the key generator determining co-prime numbers in the set of random numbers.

2. The system of claim 1, wherein the public key and the challenge are transmitted to the manufacturer, and in response the manufacturer attests to the authenticity of the component by issuing a certificate.

3. The system of claim 1, wherein the physically unclonable function (PUF) is one of an optical PUF or silicon PUF.

4. The system of claim 1, wherein the key pair is a Rivest, Shamir, and Adelman key pair.

5. The system of claim 1, wherein the key pair comprises a public key used for encryption, and a private key used for decryption.

6. The system of claim 1, wherein an attestation authority issues the challenge via a management interface of the component.

7. The system of claim 1, wherein authentication of the component is asymmetric.

8. The system of claim 1, wherein in response to a private key of the key pair being compromised, the manufacturer revokes a certificate based on the public key and the challenge.

9. The system of claim 8, wherein in response to the private key of the key pair being compromised, the manufacturer revokes the certificate and a device is quarantined.

10. The system of claim 1, wherein the physically unclonable function (PUF), pseudo-random number generator, key generator, and a signing and verification controller enables an attestation engine that is to take as input the challenge.

11. A method for asymmetric device attestation, comprising:
generating a response to a challenge via a physically unclonable function (PUF) corresponding to a component of a device;
generating a set of random numbers, by a pseudo-random number generator, based on the response;
determining co-prime numbers, by a key generator, in the set of random numbers; and
generating a key pair, by the key generator, using the co-prime numbers,
wherein a public key of the key pair is released to a manufacturer of the component for attestation of authenticity of the component, and
wherein the pseudo-random number generator terminates the generation of the set of random numbers in response to the key generator determining co-prime numbers in the set of random numbers.

12. The method of claim 11, wherein the public key and the challenge are transmitted to the manufacturer, and in response the manufacturer attests to the authenticity of the component.

13. The method of claim 11, wherein the physically unclonable function (PUF) is one of an optical PUF or silicon PUF.

14. The method of claim 11, wherein the key pair is a Rivest, Shamir, and Adelman key pair.

15. The method of claim 11, wherein the key pair comprises a public key used for encryption, and a private key used for decryption.

16. The method of claim 11, wherein an attestation authority issues the challenge via a management interface of the component.

17. The method of claim 11, wherein authentication of the component is asymmetric.

18. The method of claim 11, wherein in response to a private key of the key pair being compromised, a manufacturer revokes a certificate issued in response to the public key and the challenge.

19. The method of claim 18, wherein in response to the private key of the key pair being compromised, the manufacturer revokes the certificate and the asymmetric device is quarantined.

20. An apparatus for asymmetric device attestation, comprising:
a challenge and response system corresponding to a component of a device, comprising circuitry configured to generate a response to a challenge; and
hardware comprising:
a pseudo-random number generator to generate a set of random numbers based on the response; and
a key generator to determine co-prime numbers in the set of random numbers and generate a key pair using the co-prime numbers,
wherein a public key of the key pair is released to a manufacturer of the component for attestation of authenticity of the component,
wherein the pseudo-random number generator terminates the generation of the set of random numbers in response to the key generator determining co-prime numbers in the set of random numbers.

21. The apparatus of claim 20, wherein the public key and the challenge are transmitted to the manufacturer, and in response the manufacturer attests to the authenticity of the component by issuing a certificate.

22. The apparatus of claim 20, wherein the challenge and response system is one of an optical physically unclonable function (PUF) or silicon PUF.

* * * * *